(12) United States Patent
Nakata et al.

(10) Patent No.: US 9,981,224 B2
(45) Date of Patent: May 29, 2018

(54) EXHAUST PURIFICATION DEVICE (71) Applicant: DENSO CORPORATION, Kariya, Aichi-pref. (JP)

(72) Inventors: Shingo Nakata, Kariya (JP); Takao Mishima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/553,699

(22) PCT Filed: Feb. 12, 2016

(86) PCT No.: PCT/JP2016/000739
§ 371 (c)(1),
(2) Date: Aug. 25, 2017

(87) PCT Pub. No.: WO2016/139899
PCT Pub. Date: Sep. 9, 2016

(65) Prior Publication Data
US 2018/0050307 A1 Feb. 22, 2018

(30) Foreign Application Priority Data
Mar. 3, 2015 (JP) .................................. 2015-41090

(51) Int. Cl.
*F01N 3/023* (2006.01)
*B01D 53/94* (2006.01)
(Continued)

(52) U.S. Cl.
CPC ..... *B01D 53/9454* (2013.01); *B01D 46/2418* (2013.01); *B01J 35/04* (2013.01);
(Continued)

(58) Field of Classification Search
CPC . F01N 3/035; F01N 2330/48; B01D 46/2429; B01D 2325/10; B01D 46/2444; C04B 2235/5436; C04B 2237/365
(Continued)

(56) References Cited

U.S. PATENT DOCUMENTS 4,251,990 A     2/1981   Norimatsu et al.
4,419,108 A * 12/1983   Frost .................. B01D 39/2075
                                                                  210/510.1
(Continued)

FOREIGN PATENT DOCUMENTS

EP       1974798 A1 * 10/2008  ......... B01D 46/2429
EP       2 364 764        9/2011
(Continued)

OTHER PUBLICATIONS

International Search Report for PCT/JP2016/000739, dated Apr. 26, 2016, 6 pages.

(Continued)

*Primary Examiner* — Tom P Duong
(74) *Attorney, Agent, or Firm* — Nixon & Vanderhye P.C.

(57) ABSTRACT

An exhaust purification device purifies an exhaust gas exhausted from an internal combustion engine. The exhaust purification device has a three-way catalytic agent that is located in an exhaust passage of the internal combustion engine and a particulate filter that is located downstream of the three-way catalytic agent in the exhaust passage and that collects an exhaust particulate. The particulate filter is provided with cells that includes sealed-inlet cells of which upstream ends are sealed and through cells through which an upstream side and a downstream side of the particulate filter communicate with each other. The particulate filter is arranged at a location where a temperature of the exhaust gas reaching an upstream end of the particulate filter is higher (Continued)

than or equal to a combustion temperature of the exhaust particulate, when the three-way catalytic agent is in an active state and when the internal combustion engine is operated.

10 Claims, 5 Drawing Sheets

(51) Int. Cl.
    *B01D 46/24*     (2006.01)
    *B01J 35/04*     (2006.01)
    *F01N 3/10*     (2006.01)
    *F01N 3/022*     (2006.01)

(52) U.S. Cl.
    CPC ........... *F01N 3/0222* (2013.01); *F01N 3/101* (2013.01); *B01D 2279/30* (2013.01); *F01N 2330/30* (2013.01)

(58) Field of Classification Search
    USPC ........................................................ 422/180
    See application file for complete search history.

(56) References Cited

U.S. PATENT DOCUMENTS

| | | | | |
|---|---|---|---|---|
| 5,519,993 | A * | 5/1996 | Rao | F01N 3/0835 60/288 |
| 2004/0161373 | A1 | 8/2004 | Ichikawa et al. | |
| 2007/0020155 | A1 * | 1/2007 | Ohno | B01D 46/2429 422/177 |
| 2008/0241010 | A1 * | 10/2008 | Ohno | B01D 46/2429 422/180 |
| 2010/0011749 | A1 | 1/2010 | Fujiwara et al. | |
| 2010/0257830 | A1 | 10/2010 | Mizutani | |

FOREIGN PATENT DOCUMENTS

| | | | | |
|---|---|---|---|---|
| EP | 2364764 A1 * | 9/2011 | ......... | B01D 46/0024 |
| EP | 2380649 A1 * | 10/2011 | ......... | B01D 46/2422 |
| EP | 2 495 027 | 9/2012 | | |
| JP | S52-102934 | 8/1977 | | |
| JP | S57-201518 | 12/1982 | | |
| JP | S58-72647 | 4/1983 | | |
| JP | 2011-169155 | 9/2011 | | |
| JP | 2012-184660 | 9/2012 | | |
| JP | 2013-128913 | 7/2013 | | |
| WO | WO 2012/046484 | 4/2012 | | |

OTHER PUBLICATIONS

Written Opinion of the ISA for PCT/JP2016/000739, dated Apr. 26, 2016, 5 pages.

\* cited by examiner

EXHAUST PURIFICATION DEVICE

CROSS REFERENCE TO RELATED APPLICATION

This application is the U.S. national phase of International Application No. PCT/JP2016/000739 filed Feb. 12, 2016, which designated the U.S. and claims priority to Japanese Patent Application No. 2015-041090 filed on Mar. 3, 2015, the entire contents of each of which are incorporated herein by reference.

TECHNICAL FIELD

The present disclosure relates to an exhaust purification device that purifies exhaust gas exhausted from an internal combustion engine.

BACKGROUND ART

Exhaust gas exhausted from an internal combustion engine includes a toxic substance such as nitrogen oxide, carbon hydride, or carbon monoxide. Accordingly, an exhaust purification device purifying the exhaust gas is generally mounted in a vehicle that moves using a driving force generated by the internal combustion engine.

The exhaust purification device has a three-way catalytic agent. The three-way catalytic agent renders the toxic substance harmless by an oxidation reaction and a reduction reaction using a catalyst. The catalyst comes in an active state that causes the oxidation reaction and the reduction reaction when being heated by a heat of the exhaust gas and having a high temperature.

In recent years, exhaust particulates included in the exhaust gas are required to be reduced in addition to rendering nitrogen oxide etc. included in the exhaust gas harmless. In order to reduce the exhaust particulates, an air-fuel ratio in cylinders of the internal combustion engine may be controlled to reduce a generation amount of the exhaust particulates. However, the exhaust particulates are desired to be reduced in quantity in addition to in weight, and therefore reducing the generation amount is not sufficient.

Then, Patent Literature 1 discloses an exhaust purification device that has, in addition to the three-way catalytic agent, a particulate filter that is arranged in an exhaust passage and collects the exhaust particulates. The particular filter suppresses an emission of the exhaust particulates included in the exhaust gas to outside.

An amount of the exhaust particulates accumulated in the particulate filter increases as time elapses. According to the exhaust purification device disclosed in Patent Literature 1, the exhaust particulates accumulated in the particulate filter are burnt to be removed from the particulate filter, such that the particulate filter is prevented from being clogged. In addition, the particulate filter is arranged upstream of the three-way catalytic agent (i.e., on a side adjacent to the internal combustion engine) such that the exhaust gas, which has a high temperature for burning the exhaust particulates, is supplied to the particulate filter.

PRIOR ART LITERATURES

Patent Literature

Patent Literature 1: JP 4710846 B2

SUMMARY OF INVENTION

The particulate filter has a porous body and physically removes the exhaust particulates from the exhaust gas in a manner that the exhaust particulates pass through the porous body. Accordingly, a pressure loss in the exhaust passage tends to be relatively large by disposing the particulate filter in the exhaust passage. Particularly, according to studies conducted by the inventors of the present disclosure, the pressure loss may be significantly large since the particulate filter blocks a flow of the exhaust gas having a high temperature and a large volume flow when the particulate filter is located upstream of the three-way catalytic agent as in the exhaust purification device described in Patent Literature.

As a result, the large pressure loss may have an effect on an operation of the internal combustion engine. The pressure loss is, in other words, an increase of a pressure on an upstream side of the particulate filter. The pressure loss increases as the amount of the exhaust particulates accumulated in the particulate filter increases. The pressure loss may be further increased as an amount of non-combustible component (Ash), which is included in the exhaust particulates, accumulated in the porous body increases.

The particulate filter has a relatively large thermal capacity. Therefore, according to the exhaust purification device disclosed in Patent Literature 1, relatively long time period is required from a time at which an operation of the internal combustion engine is started to a time at which the exhaust gas having a high temperature reaches the three-way catalytic agent. That is, it is difficult for the three-way catalytic agent to come in the active state in a short time.

According to Patent Literature 1, an auxiliary three-way catalytic agent is arranged at a location upstream of the particulate filter, such that a purification of the exhaust gas is started promptly. The location upstream of the particulate filter is, in other words, a location being heated easily by the exhaust gas. However, the catalytic agent located upstream of the particulate filter is auxiliary, and a three-way catalytic agent located downstream of the particulate filter mainly functions as the three-way catalytic agent. Therefore, the thermal capacity of the particulate filter may have an effect (i.e., a start of the purification may be delayed).

The configuration described in Patent Literature 1 may be modified to have a particulate filter located downstream of the three-way catalytic agent, such that a time duration required for making the three-way catalytic agent to be in the active state is shortened and that an effect of the pressure loss, depending on the location of the particulate filter, is reduced.

In the above-described configuration, a temperature of the exhaust gas reaching the particulate filter falls as increasing a distance from the three-way catalytic agent arranged upstream of the particulate filter to the particulate filter arranged downstream of the three-way catalytic agent. As a result, the exhaust particulates cannot be burnt and cannot be removed from the particulate filter. On the other hand, the particulate filter blocks the flow of the exhaust gas, having a high temperature and large volume flow, when the above-described distance is shortened. As a result, the large pressure loss may have an effect on an operation of the internal combustion engine.

As described above, no specific configuration that can burn and remove the exhaust particulates accumulated in the particulate filter and can reduce an effect of the pressure loss caused by the particulate filter.

The present disclosure addresses the above-described issues, and it is an objective of the present disclosure to provide an exhaust purification device that can reduce an effect of a pressure loss caused by a particulate filter while being capable of removing exhaust particulates accumulated in the particulate filter by burning the exhaust particulates.

An exhaust purification device according to the present disclosure purifies an exhaust gas exhausted from an internal combustion engine. The exhaust purification device has a three-way catalytic agent and a particulate filter. The three-way catalytic agent is located in an exhaust passage of the internal combustion engine. The particulate filter is located downstream of the three-way catalytic agent in the exhaust passage and collects an exhaust particulate. The three-way catalytic agent is one of controlled object catalytic agents and is arranged at a most upstream location in the controlled object catalytic agents. The exhaust gas flows through the plurality of controlled object catalytic agents. An air-fuel ratio of the exhaust gas, immediately after passing through the plurality of control subject catalytic agents, is used for controlling an air-fuel ratio of the internal combustion engine. The particulate filter is a honeycomb body provided with cells. A part of the cells are sealed-inlet cells of which upstream ends are sealed. At least a part of other cells of the cells other than the sealed-inlet cells are through cells through which an upstream side and a downstream side of the particulate filter communicate with each other. The particulate filter is arranged at a location where a temperature of the exhaust gas reaching an upstream end of the particulate filter is higher than or equal to a combustion temperature of the exhaust particulate, when the three-way catalytic agent is in an active state and when the internal combustion engine is operated.

According to the exhaust purification device having the above-described configuration, the three-way catalytic agent is located upstream of the particulate filter. Accordingly, a thermal capacity of the particulate filter does not have an effect on a heating of the three-way catalytic agent using the exhaust gas, and thereby the three-way catalytic agent can come in the active state in a relatively short time.

In addition, the three-way catalytic agent is one of the controlled objective catalytic agents. That is, the air-fuel ratio of the internal combustion engine is controlled based on a feedback of the air-fuel ratio of the exhaust gas immediately after passing through the three-way catalytic agent. Therefore, a location of the particulate filter does not have an effect on a purification performance of the three-way catalytic agent purifying the exhaust gas.

"The three-way catalytic agent is arranged at the most upstream location in the controlled object catalytic agents" means that the three-way catalytic agent of the present disclosure is arranged at the most upstream location in the controlled object catalytic agents when a quantity of the controlled object catalytic agent is more than one. In addition, an aspect that has single controlled object catalytic agent and that no controlled catalytic agent is located upstream of the three-way catalytic agent is included in the aspect that the three-way catalytic agent is arranged at the most upstream location in the controlled object catalytic agents.

The particulate filter is arranged at the location where the temperature of the exhaust gas reaching an inlet (i.e., the upstream end) of the particulate filter can be higher than or equal to the combustion temperature of the exhaust particulate in a normal operation condition. The normal operation condition is, for example, a condition where the three-way catalytic agent is in the active state and where the internal combustion engine is operated. That is, a distance between the three-way catalytic agent and the particulate filter is short enough so as to burn exhaust particulates accumulated in the particulate filter by heat of the exhaust gas flowing from the three-way catalytic agent. Thus, the particulate filter can be recovered.

The particulate filter is the honeycomb body provided with cells. A part of the cells are through cells through which an upstream side and a downstream side of the particulate filter communicate with each other. A passage resistance of the particulate filter as a whole is relatively small by providing the through cells. As a result, a large pressure loss having an effect on an operation of the internal combustion engine is not caused even when the particulate filter is arranged at a location where the exhaust gas having a relatively high temperature flows.

A non-combustible component included in the exhaust particulates may remain in the particulate filter after the exhaust particulates are burnt and removed from the particulate filter. However, most part of the non-combustible component flows through the through cells and is emitted to a downstream side of the particulate filter. Accordingly, an increase of the pressure loss, caused when the non-combustible component is accumulated, can be suppressed.

Thus, according to the present disclosure, it is able to provide the exhaust purification device that can reduce an effect of the pressure loss caused by the particulate filter while being capable of burning and removing the exhaust particulates accumulated in the particulate filter.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. The same component is assigned with the same reference number in the drawings, and a redundant explanation will be omitted, such that the following description can be understood easily. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
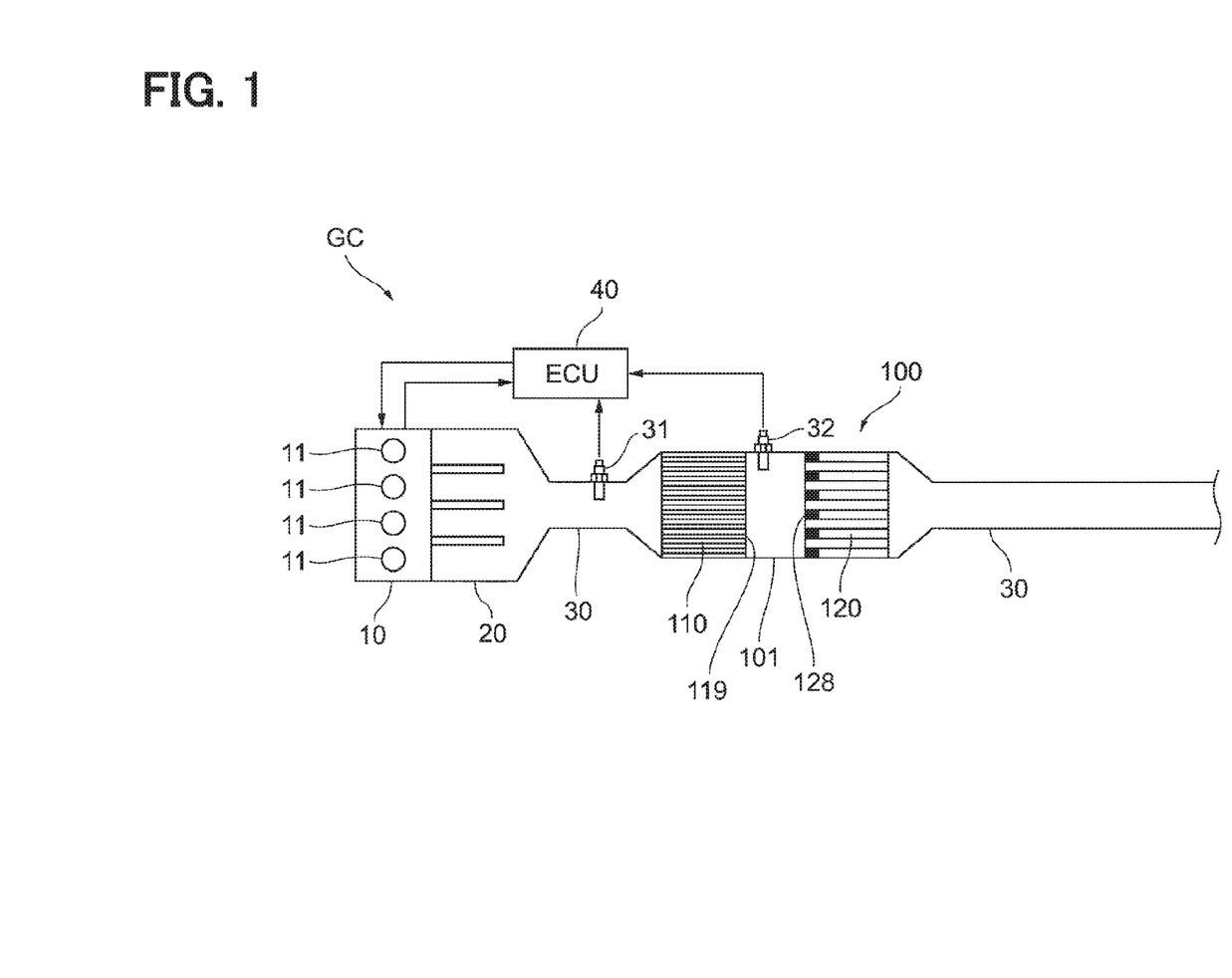
FIG. 1 is a diagram illustrating a configuration of an exhaust purification device according to a first embodiment.

An exhaust purification device 100 according to a first embodiment will be described referring to FIG. 1. The exhaust purification device 100 is mounted in a vehicle GC having an internal combustion engine 10 and is configured as a device that purifies exhaust gas exhausted from the internal combustion engine 10.

A configuration of the vehicle GC will be described in advance of explaining a specific configuration of the exhaust purification device 100. FIG. 1 schematically illustrates the internal combustion engine 10 and a peripheral configuration of the internal combustion engine 10 of the vehicle GC, and illustrations of other configurations such as a braking device and a steering device are omitted. The vehicle GC has the internal combustion engine 10, a manifold 20, an exhaust pipe 30, and a controller 40.

The internal combustion engine 10 is a gasoline engine having four cylinders 11. Each cylinder 11 has an injection valve (not shown). A fuel supplied from the injection valve and air supplied from an outside are combusted in each cylinder 11. The internal combustion engine 10 uses the combustion and generates a driving force, i.e., a traveling force, moving the vehicle GC. The controller 40 controls timing for injecting the fuel by the injection valve and an injection volume of the fuel.

The manifold 20 is a pipe that guides the exhaust gas, which is generated in the combustion in each cylinder 11, to the exhaust pipe 30 described later. An upstream portion of the manifold 20 is branched into four paths, and the four paths are connected to exhaust ports (not shown) of the four cylinders 11 respectively. A downstream portion of the manifold 20 is a pipe defining a single passage and is connected to an upstream end of the exhaust pipe 30. The exhaust gases generated in the four cylinders 11 join together in the manifold 20 and flow into the exhaust pipe 30.

The exhaust pipe 30 is a pipe (i.e., an exhaust passage) that emits the exhaust gas, which flows from the four cylinders 11 to the exhaust pipe 30 through the manifold 20, to an outside of the vehicle GC. The exhaust purification device 100 is disposed to the exhaust pipe 30.

The controller 40 is a computer system having CPU, ROM, RAM, and output interface and is a device (i.e., ECU) that controls an operation of the internal combustion engine 10. The controller 40 controls a supply volume of air supplied to each cylinder 11 and the injection volume of the fuel injected by the injection valve based on a displace amount of an acceleration pedal (not shown) operated by a driver of the vehicle GC.

The above-described control is performed such that an air-fuel ratio in each cylinder 11 basically coincides with a specified target value (i.e., a theoretical air-fuel ratio). However, the air-fuel ratio may be lean, for example, when a so-called fuel constraint performance is operated.

An A/F sensor 31 and an $O_2$ sensor 32 are located in the exhaust pipe 30. The A/F sensor 31 is a sensor that detects an oxygen concentration in the exhaust gas linearly. The $O_2$ sensor 32 is a sensor that determines whether the oxygen concentration in the exhaust gas is rich or lean. The A/F sensor 31 is located upstream of the exhaust purification device 100 in the exhaust pipe 30. The $O_2$ sensor 32 is located downstream of the A/F sensor 31 in the exhaust purification device 100. The location of the $O_2$ sensor 32 is, in other words, a location between a three-way catalytic agent 110 and a particulate filter 120. The A/F sensor 31 and the $O_2$ sensor 32 may be arranged in a reverse order as compared to the above-described order. That is, the $O_2$ sensor 32 may be located upstream of the A/F sensor 31, and the AT sensor 31 may be located downstream of the $O_2$ sensor 32.

The oxygen concentrations detected by the A/F sensor 31 and the $O_2$ sensor 32 are sent to the controller 40 as electric signals (e.g., a current value) respectively. The electric signals are, in other words, a signal corresponding to the air-fuel ratio of the exhaust gas. The electric signal sending from each of the A/F sensor 31 and the $O_2$ sensor 32 to the controller 40 will be referred to as "air-fuel ratio signal".

The controller 40 adjusts the injection volume from the injection valve to each cylinder 11 based on the air-fuel ratio signals from the A/F sensor 31 and the $O_2$ sensor 32, and thereby controls the air-fuel ratio to coincide with the target value (i.e., the theoretical air-fuel ratio).

Specifically, the $O_2$ sensor 32 measures the air-fuel ratio of the exhaust gas immediately after passing through the three-way catalytic agent 110, and the measured value (i.e., the air-fuel ratio signal) is sent, i.e., given as a feedback, to the controller 40. The controller 40 adjusts the oxygen concentration, which is a value measured by the A/F sensor 31, at a location upstream of the three-way catalytic agent 110 such that the measured value measured by the $O_2$ sensor 32 coincides with the target value.

The three-way catalytic agent 110 having the above-described configuration is a catalytic agent used for controlling the air-fuel ratio of the internal combustion engine 10. Specifically, the air-fuel ratio of the internal combustion engine 10 is controlled based on the air-fuel ratio of the exhaust gas immediately after passing through the catalytic agent. Such catalytic agent will be described as "controlled object catalytic agent" hereafter. A quantity of the controlled object catalytic agent is one according to the present embodiment, however more than one of the controlled object catalytic agent may be disposed in addition to the three-way catalytic agent 110.

In a case where more than one controlled object catalytic agent is disposed, the particulate filter 120 is located between a first controlled object catalytic agent of the controlled object catalytic agents located at a most upstream location in the controlled object catalytic agents and a second one of the controlled object catalytic agents located second from the first controlled object catalytic agent.

The configuration of the exhaust purification device 100 will be described hereafter. As described above, the exhaust purification device 100 is located between an upstream end and a downstream end of the exhaust purification device 100.

According to the configuration of the exhaust purification device 100, the three-way catalytic agent 110 and the particulate filter 120 are located inside a housing 101. The housing 101 is a case having a tubular shape. An upstream end and a downstream end of the housing 101 are connected to the exhaust pipe 30. That is, the housing 101 is a pipe configuring a part of the exhaust pipe 30.

The three-way catalytic agent 110 purifies a toxic substance included in the exhaust gas by an oxidation reaction and a reduction reaction. The toxic substance is hydrocarbon, carbon monoxide, or nitrogen oxide, for example. The three-way catalytic agent 110 is located in an upstream portion of an inner space defined in the housing 101. The three-way catalytic agent 110 therein has a catalyst carrier (not shown) that holds platinum, palladium, and rhodium as catalysts. The hydrocarbon, carbon monoxide, or nitrogen oxide included in the exhaust gas are purified by being in contact with the catalysts, and subsequently are emitted from a downstream end surface 119 of the three-way catalytic agent 110 to a downstream side. The catalyst carrier of the three-way catalytic agent 110 holds a substance capable of storing oxygen as well. Accordingly, a purification of the exhaust gas performed in the three-way catalytic agent 110 can be performed stably even when the oxygen concentration in the exhaust gas flowing into the three-way catalytic agent 110 varies.

The oxidation reaction and the reduction reaction caused in the three-way catalytic agent 110 can be caused when a temperature of the three-way catalytic agent 110 is relatively high. The three-way catalytic agent 110 is heated by the exhaust gas flowing through the three-way catalytic agent 110 and is maintained in a condition that the oxidation reaction and the reduction reaction can be caused easily. Such condition of the three-way catalytic agent 110 will be referred to as "active state" hereafter.

The particulate filter 120 is a filter that collects exhaust particulates 50 included in the exhaust gas. The exhaust particulates 50 are a particulate that is produced in the combustion in the cylinders 11 and has a micro diameter. The exhaust particulates 50 have carbon as a main component. The particulate filter 120 is located downstream of the three-way catalytic agent 110 in the interior space of the housing 101.

The downstream end surface 119 of the three-way catalytic agent 110 and an upstream end surface 128 of the particulate filter 120 are distanced from each other, and a void is defined between the downstream end surface 119 and the upstream end surface 128. The $O_2$ sensor 32 is arranged to measure the oxygen concentration in the void.

A configuration of the particulate filter 120 will be described in detail referring to FIG. 2. The particulate filter 120 is a honeycomb body that is a porous body made by cordierite. The porous body holds the catalysts that cause combustion of the exhaust particulates 50.

The particulate filter 120 is provided with cells (i.e., straight paths) extending from the upstream end surface 128 to a downstream end surface 129. Some of the cells have upstream ends that area sealed by sealing portions 125. Others of the cells are configured as a path passing through the particulate filter 120 from the upstream end surface 128 to the downstream end surface 129. The sealing portions 125 are made of the same material as a material (i.e., cordierite) making other portion of the particulate filter 120.

The cells of which upstream ends are sealed by the sealing portions 125 will be referred to as "sealed-inlet cells 122". The cells passing through the particulate filter 120 from the upstream end surface 128 to the downstream end surface 129 will be referred to as "through cells 123".

The sealed-inlet cells 122 and the through cells 123 are arranged adjacent to each other. In other words, the sealed-inlet cells 122 and the through cells 123 are arranged alternately with each other. A wall partitioning the sealed-inlet cells 122 and the through cells 123 from each other is configured by the porous body and will be referred to as "a porous wall 121".

All of the sealed-inlet cells 122 and all of the through cells 123 are not necessary to be arranged alternately with each other. For example, an entirety of a part of the through cells 123 may be surrounded by the rest of the through cells 123. That is, the particulate filter 120 may have a portion in which the sealed-inlet cells 122 and the through cells 123 are not arranged alternately with each other.

An example of a method for manufacturing the particulate filter 120 will be described hereafter. The honeycomb body is formed by extrusion molding, and is baked. According to the present embodiment, the honeycomb body is a body in which all cells provided therein are through cells. Subsequently, a masking treatment is applied on one end surface of the honeycomb body to seal one ends of a part of the cells. The one end surface of the honeycomb body is soaked in a slurry including a ceramic raw material such that inlet portions of the cells to which the masking treatment is not applied are filled with the slurry. The honeycomb body is baked again, and then, the cells to which the masking treatment is applied become the through cells 123, and the cells to which the masking treatment is not applied (i.e., to which the slurry is applied) become the sealed-inlet cells 122. The above-described method is just an example, and the particulate filter 120 may be manufactured by another method.

A flow of the exhaust gas passing through the particulate filter 120 will be described hereafter referring to FIG. 2. FIG. 2 schematically illustrates the flow of the exhaust gas by arrow AR1 and arrow AR2.

As shown by arrow AR1, the exhaust gas flows into the particulate filter 120 from the upstream ends of the through cells 123. The exhaust gas includes a considerable quantity of the exhaust particulates 50.

The through cells 123 are paths passing through the particulate filter 120 from an upstream end to a downstream end, however a sectional area of the paths is small. Accordingly, a pressure in the through cells 123 increases when the exhaust gas flows into the through cells 123. The pressure is highest in inlet portions of the through cells 123 (on a side adjacent to the upstream end surface 128) and is lowest in outlet portions of the through cells 123 (on a side adjacent to the downstream end surface 129). The pressure in the outlet portions of the through cells 123 is substantially equal to a pressure on a downstream side of the particulate filter 120, i.e., an atmospheric pressure.

On the other hand, the sealed-inlet cells 122 have inlet portions (on a side adjacent to the upstream end surface 128) that are sealed by the sealing portions 125, and thereby the exhaust gas does not flow directly into the sealed-inlet cells 122. Accordingly, a pressure in the sealed-inlet cells 122 hardly increases, and a pressure in an entirety of the sealed-inlet cells 122 is substantially equal to the atmospheric pressure.

As a result, a pressure difference between a pressure in the through cells 123 and a pressure in the sealed-inlet cells 122 is caused. When the exhaust gas flows into the through cells 123, a part of the exhaust gas flows into the sealed-inlet cells 122 through the porous walls 121 due to the pressure difference (refer to arrow AR2). On this occasion, the exhaust particulates 50 cannot pass through the porous walls 121 and are collected and accumulated on inner wall surfaces of the through cells 123. The exhaust gas flowing into the sealed-inlet cells 122, i.e., the exhaust gas from which the exhaust particulates 50 are removed, flows in the sealed-inlet cells 122 toward the downstream side and is emitted from the outlet portions of the sealed-inlet cells 122 (on the side adjacent to the downstream end surface 129).

Figure 5:
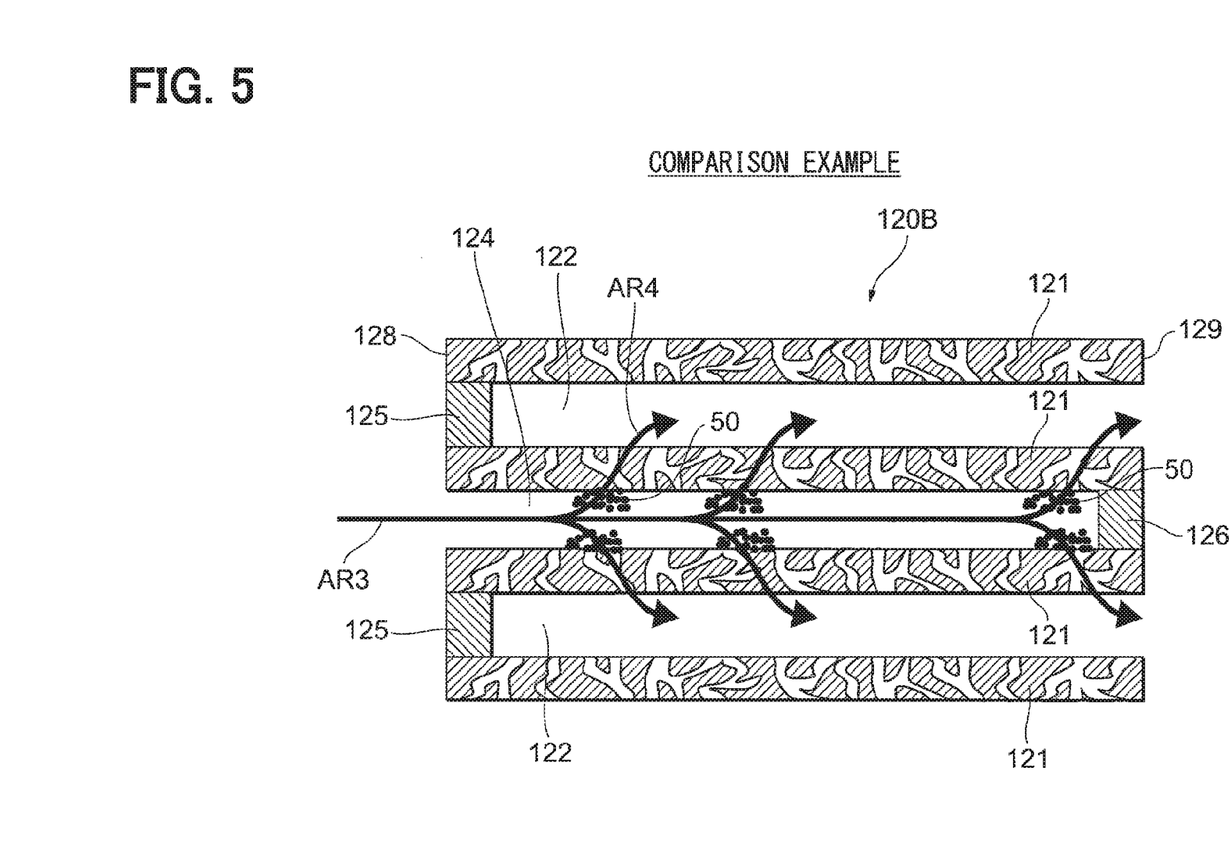
FIG. 5 is a diagram illustrating a configuration of a particulate filter of an exhaust purification device according to a comparison example of the present disclosure.

A configuration of a particulate filter 120E and a flow of exhaust gas passing through the particulate filter 1206 according to a comparison example of the present disclosure will be described referring to FIG. 5. The particulate filter 120B is different from the particulate filter 120 shown in FIG. 2 in a configuration that downstream ends of the through cells 123 are sealed by sealing portions 126. Other portions of the configuration of the particulate filter 1206 are the same as those of the particulate filter 120.

The cells of which downstream ends are sealed by the sealing portions 126 will be referred to as "sealed-outlet cells 123" hereafter. The particular filter 120B does not have a cell passing through the particular filter 120B from an upstream end to a downstream end as the through cells 123.

The sealed-inlet cells 122 and the sealed-outlet cells 124 are arranged adjacent to each other through the porous walls 121 respectively. In other words, the sealed-inlet cells 122 and the sealed-outlet cells 124 are arranged alternately with each other through the porous walls 121. A method for forming the sealing portions 126 on the side adjacent to the downstream end surface 129 is the same as the above-described method for forming the sealing portion 125, therefore a description of the method will be omitted.

The flow of the exhaust gas passing through the particulate filter 120B will be described hereafter. FIG. 5 schematically illustrates the flow of the exhaust gas by arrow AR3 and arrow AR4.

As shown by arrow AR3, the exhaust gas flows into the particulate filter 120B from upstream ends of the sealed-outlet cells 124. The exhaust gas includes a considerable quantity of the exhaust particulates 50.

The sealed-outlet cells 124 have downstream ends sealed by the sealing portions 126. Accordingly, a pressure in the sealed-outlet cells 124 increases when the exhaust gas flows into the sealed-outlet cells 124. Similar to a case of the through cells 123 of the particulate filter 120, the pressure in the sealed-outlet cells 124 is highest in inlet portions of the sealed-outlet cells 124 (on the side adjacent to the upstream end surface 128) and is lowest in outlet portions of the sealed-outlet cells 124 (on the side adjacent to the downstream end surface 129). However, the pressure in the sealed-outlet cells 124 is higher than the atmospheric pressure as a whole of the sealed-outlet cells 124 including the outlet portions.

According to the particulate filter 120B, the sealed-inlet cells 122 have the inlet portions (on the side adjacent to the upstream end surface 128) that are sealed by the sealing portions 125, and thereby the exhaust gas does not flow directly into the sealed-inlet cells 122. Accordingly, the pressure in the sealed-inlet cells 122 hardly increases, and the pressure in an entirety of the sealed-inlet cells 122 is substantially equal to the atmospheric pressure.

As a result, a pressure difference between a pressure in the sealed-outlet cells 124 and a pressure in the sealed-inlet cells 122 is caused. When the exhaust gas flows into the sealed-outlet cells 124, a part of the exhaust gas flows into the sealed-inlet cells 122 through the porous walls 121 due to the pressure difference (refer to arrow AR4). On this occasion, the exhaust particulates 50 cannot pass through the porous walls 121 and are collected and accumulated on inner wall surfaces of the sealed-outlet cells 124. The exhaust gas flowing into the sealed-inlet cells 122, i.e., the exhaust gas from which the exhaust particulates 50 are removed, flows in the sealed-inlet cells 122 toward the downstream side and is emitted from the outlet portions of the sealed-inlet cells 122 (on the side adjacent to the downstream end surface 129).

A difference between the particulate filter 120 and the particulate filter 120B will be described hereafter. According to the particulate filter 120 of the present embodiment, the part of the exhaust gas does not pass through the porous walls 121, however passes through the through cells 123 and then is emitted from the particulate filter 120. Accordingly, an entirety of the exhaust gas passing through the particulate filter 120 receives a small passage resistance. That is, the pressure loss caused by disposing the particulate filter 120 is relatively small.

On the other hand, according to the particulate filter 120B of the comparison example, an entirety of the exhaust gas is necessary to pass through the porous walls 121. Accordingly, the entirety of the exhaust gas passing through the particulate filter 120B receives a large passage resistance. That is, the pressure loss caused by disposing the particulate filter 120B is relatively large.

According to the particulate filter 120 of the present embodiment, most of the exhaust particulates 50 flowing into the through cells 123 are accumulated on the inner wall surface of the through cells 123, however a part of the exhaust particulates 50 flows through the through cells 123 and is emitted from the downstream end surface 129 of the particulate filter 120.

On the other hand, the particulate filter 120B of the comparison example has no path that connects to the downstream end of the particulate filter 120B without passing through the porous walls 121. Accordingly, most of the exhaust particulates 50 flowing into the particulate filter 120B are collected by the porous walls 121, and the exhaust particulates 50 hardly pass through the particulate filter 120B.

Then, according to the particulate filter 120 of the present embodiment, a deterioration of a performance for collecting the exhaust particulates 50 is suppressed as much as possible, and the pressure loss (i.e., the passage resistance) in the exhaust pipe 30 is reduced.

Figure 3:
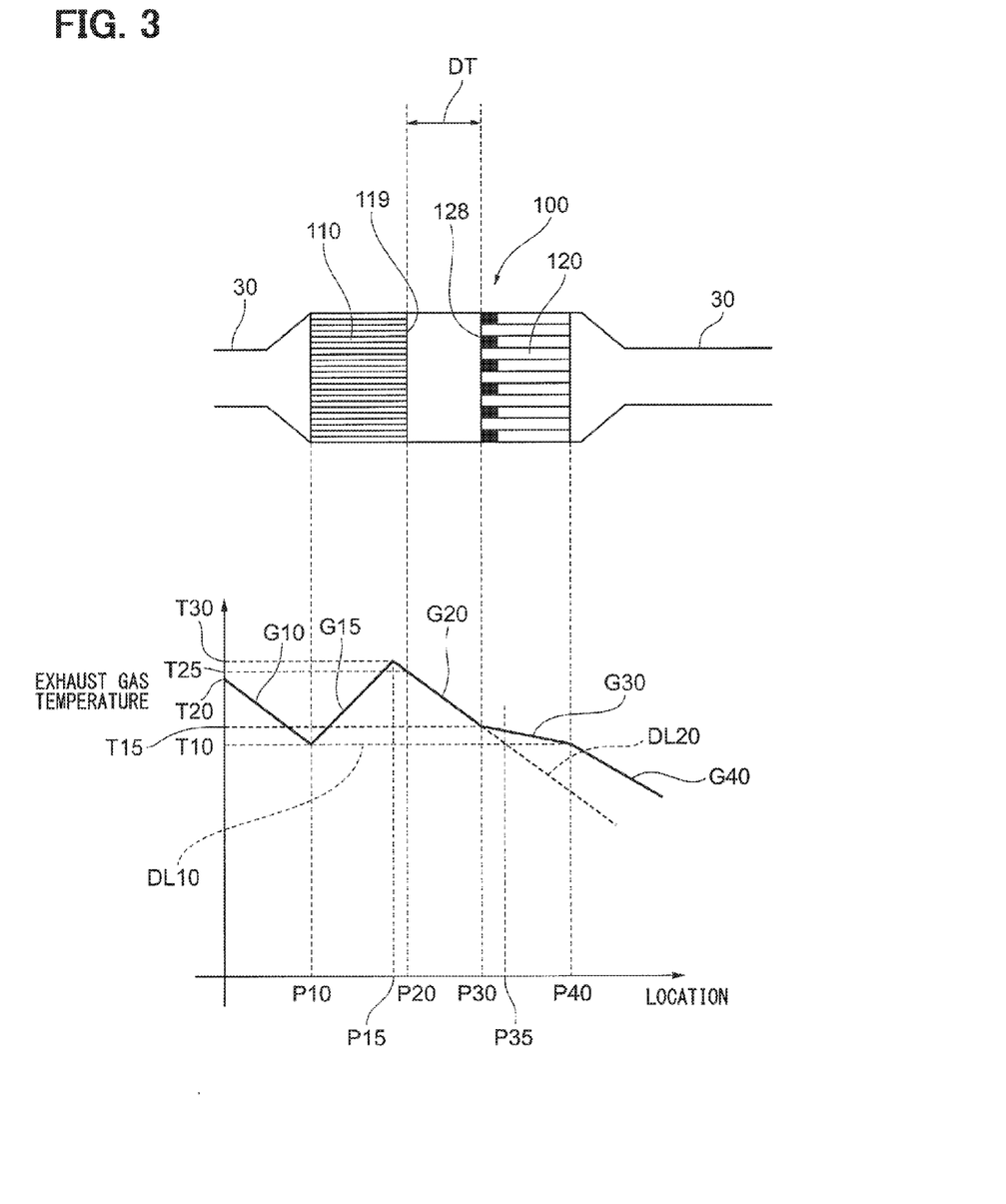
FIG. 3 is a diagram illustrating a temperature distribution in the exhaust purification device.

A temperature distribution of the exhaust gas in the exhaust purification device 100 will be described hereafter referring to FIG. 3. A graph shown in a lower area of FIG. 3 is a graph that shows the temperature distribution (i.e., a distribution of an exhaust gas temperature) in the exhaust purification device 100 in a condition that a temperature of the three-way catalytic agent 110 is high enough to make the three-way catalytic agent 110 to be in the active state and that the internal combustion engine 10 is operated. In the graph, a relationship between a distance from an inlet of the exhaust purification device 100 and a temperature at a location corresponding to the distance is shown. In the following description, for example, a location where a distance from the inlet of the exhaust purification device 100 is P10 will be referred to as "a location P10".

A temperature T20 at the inlet of the exhaust purification device 100 is close to a temperature of the exhaust gas immediately after being exhausted from the internal combustion engine 10 and is relatively high.

As shown by line G10, the temperature of the exhaust gas falls as the exhaust gas flows in the exhaust pipe 30 toward the downstream side. A temperature of the three-way catalytic agent 110 at the upstream end (i.e., the location P10) is a temperature T10 that is lower than the temperature T20.

The oxidation reaction and reduction reaction, which are a heat generating reaction, are caused in the three-way catalytic agent 110. Accordingly, as shown by line G15, the temperature of the exhaust gas passing through the three-way catalytic agent 110 increases toward the downstream side. The temperature of the exhaust gas is increasing until the exhaust gas reaches a location P15 that is located slightly upstream of the downstream end (i.e., the downstream end surface 119) of the three-way catalytic agent 110. The purification of the exhaust gas flowing into the three-way catalytic agent 110 is almost completed at the location P15. The temperature, i.e., a temperature T30, of the exhaust gas is highest at the location P15.

As shown by line G20, the temperature of the exhaust gas falls toward the downstream side on a downstream side of the location P15 and becomes a temperature T25 at the downstream end (i.e., the downstream end surface 119) of the three-way catalytic agent 110. The temperature of the exhaust gas further falls and becomes a temperature T15 (which is lower than the temperature T25) at a location P30 corresponding to the upstream end (i.e., the upstream end surface 128) of the particulate filter 120. The temperature T15 is higher than a temperature (i.e., the temperature T10) of the exhaust gas at the upstream end of the three-way catalytic agent 110.

As shown by line G30, the temperature of the exhaust gas falls toward the downstream side on a downstream side of the location P30 (i.e., inside the particulate filter 120). As shown by line G40, the temperature of the exhaust gas still falls toward the downstream side on a downstream side of a location P40 corresponding to the downstream end of the particulate filter 120.

According to the present embodiment, a temperature decrease variation from a temperature of the exhaust gas emitted from the three-way catalytic agent 110 to a temperature of the exhaust gas reaching the upstream end (i.e., the upstream end surface 128) of the particulate filter 120 is smaller than or equal to 50° C. The temperature decrease variation is a value calculated by subtracting the temperature T15 from the temperature T25. In other words, the particulate filter 120 is arranged at a location where the temperature decrease variation of the exhaust gas from the downstream end of the three-way catalytic agent 110 to the upstream end surface 128 of the particulate filter 120 is smaller than or equal to 50° C. That is, a distance DT between the downstream end surface 119 of the three-way catalytic agent 110 and the upstream end surface 128 of the particulate filter 120 is set such that the temperature decrease variation in the void defined between the three-way catalytic agent 110 and the particulate filter 120 becomes smaller than or equal to 50° C.

Since the particulate filter 120 is arranged as described above, the exhaust gas having a relatively high temperature reaches to the upstream end of the particulate filter 120. The temperature of the exhaust gas reaching the particulate filter 120 may fall to about 400° C. when the vehicle GC moves at a normal speed. However, the temperature of the exhaust gas reaching the particulate filter 120 may exceed 500° C. when the vehicle GC is accelerated. "When the vehicle GC moves at a normal speed" means that the internal combustion engine 10 is operated under low load. "When the vehicle GC is accelerated" means that the internal combustion engine 10 is operated under high load.

Thus, the particulate filter 120 is arranged at a location where the exhaust gas of which temperature is higher than or equal to 500° C. reaches to the particulate filter 120 frequently. 500° C. is the combustion temperature at which the exhaust particulates 50 are burnt. The combustion temperature of the exhaust particulates 50 is a temperature at which the exhaust particulates 50 are burnt when being in contact with oxygen. 500° C. is an example, and a different temperature may be set as the combustion temperature at which the exhaust particulates 50 are burnt.

The exhaust particulates 50 are burnt, and an accumulated amount of the exhaust particulates 50 is reduced, when the oxygen concentration in the exhaust gas increases temporary, for example, by operating the fuel constraint performance. That is, the particulate filter 120 is recovered. According to the present embodiment, the particulate filter 120 is recovered relatively frequently without performing a heating using a heater etc. Therefore, the particulate filter 120 can be used for a long time without maintenance.

The exhaust particulates 50 include a non-combustible component (Ash) that cannot be removed by being burnt. Accordingly, even when the combustion of the exhaust particulates 50 causes frequently, the non-combustible component accumulates in the particulate filter 120, and the pressure loss in the particulate filter 120 may increase.

However, according to the present embodiment, most of the non-combustible component accumulates on the inner wall surface of the through cells 123, and the accumulated non-combustible component easily passes through the through cells 123 and is easily emitted from the particulate filter 120. Moreover, since the combustion of the exhaust particulates 50 is caused frequently, a generation amount of the non-combustible component generated in a single combustion is small, and most of the non-combustible component is considered to be emitted immediately after being generated.

As a result, an accumulation of the non-combustible component in the particulate filter 120 hardly occurs, or occurs with an extremely low accumulation speed. Therefore, the particulate filter 120 can be used for a long time without maintenance.

The particulate filter 120 may block a flow of the exhaust gas having a high temperature and a high volume flow, and a large pressure loss may have an effect on an operation of the internal combustion engine 10, when the particulate filter 120 is arranged at a location where the exhaust gas having a high temperature reaches as the present embodiment. However, as described above, the pressure loss in the particulate filter 120 is relatively small as compared to the comparison example shown in FIG. 5. Accordingly, the pressure loss having an effect on the operation of the internal combustion engine 10 is not caused in the exhaust purification device 100 even when the exhaust gas having a high temperature passes through the particulate filter 120.

A location where the particulate filter 120 is located is not limited to the above-described location where the temperature decrease variation of the exhaust gas is smaller than or equal to 50° C. The particulate filter 120 may be arranged at a location where the temperature of the exhaust gas at the upstream end of the particulate filter 120 is higher than or equal to the combustion temperature of the exhaust particulates 50.

For example, the particulate filter 120 may be arranged at a location where the distance DT between the downstream end surface 119 of the three-way catalytic agent 110 and the upstream end surface 128 of the particulate filter 120 is shorter than or equal to 50 cm. According to such configuration, the exhaust gas having a high temperature higher than or equal to the combustion temperature of the exhaust particulates 50 can reach the upstream end of the particulate filter 120.

Furthermore, the particulate filter 120 may be arranged at a location where the temperature (e.g., the temperature T15 in FIG. 3) of the exhaust gas reaching the upstream end of the particulate filter 120 becomes higher than or equal to a temperature (e.g., the temperature T10 in FIG. 3) of the exhaust gas immediately before flowing into the three-way catalytic agent 110. Such location is located upstream of a location P35 in FIG. 3.

The location P35 in FIG. 3 is a location shown by a point on a vertical line (i.e., a dashed line DL20) where the temperature of the exhaust gas becomes T15. The vertical line is given by extending the graph (i.e., the line G20), which shows the temperature decrease variation of the exhaust gas in a space upstream of the particulate filter 120, toward the downstream side of the location P30.

When the particulate filter 120 is arranged at such location, the temperature of the exhaust gas reaching the upstream end of the particulate filter 120 becomes higher than or equal to the temperature of the exhaust gas immediately after being exhausted from the internal combustion engine 10. Therefore, the exhaust gas having a high temperature higher than or equal to the combustion temperature of the exhaust particulates 50 can reach the upstream end of the particulate filter 120.

Second Embodiment

Figure 4:
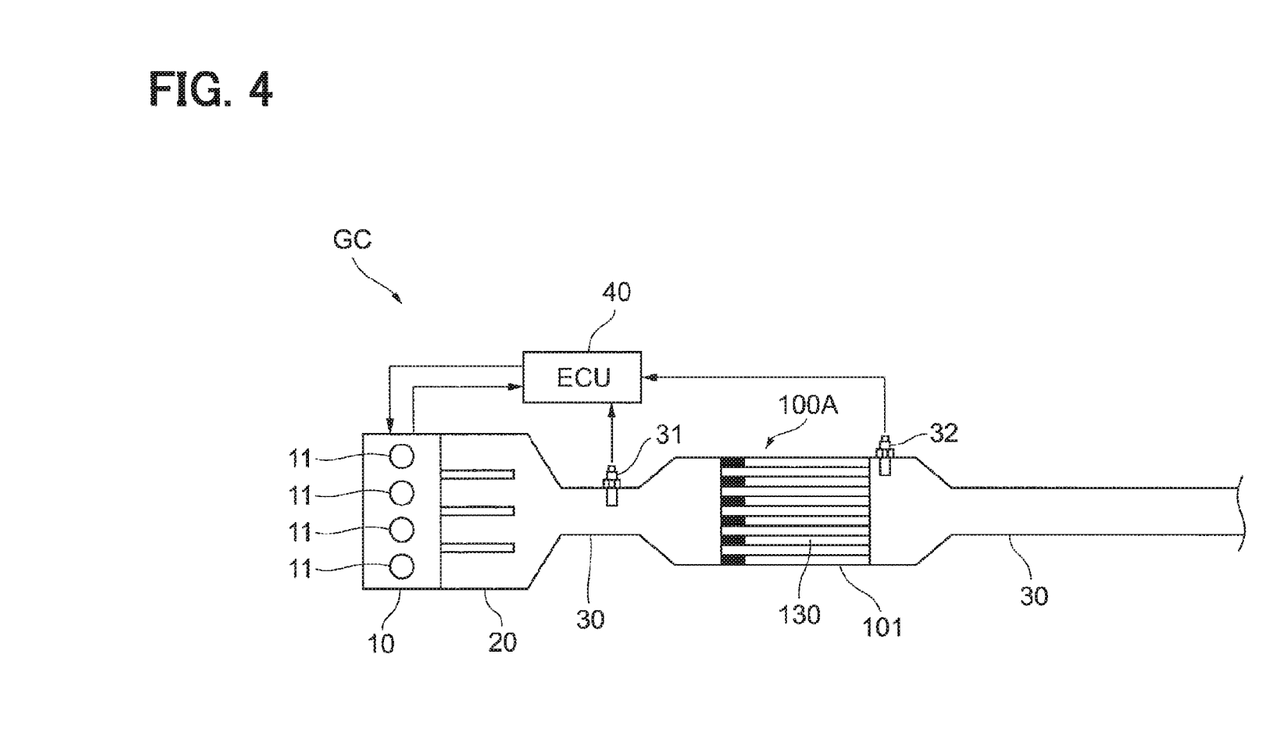
FIG. 4 is a diagram illustrating a configuration of an exhaust purification device according to a second embodiment.

An exhaust purification device 100A according to a second embodiment will be described hereafter referring to FIG. 4. The exhaust purification device 100A does not have the three-way catalytic agent 110 and the particulate filter 120 of the first embodiment. Instead, the exhaust purification device 100A has a single particulate filter 130 (i.e., a particulate filter with a catalyst) holding catalysts integrally with each other. The particulate filter 130 is a honeycomb member that has a similar configuration as the particulate filter 120 of the first embodiment.

Figure 2:
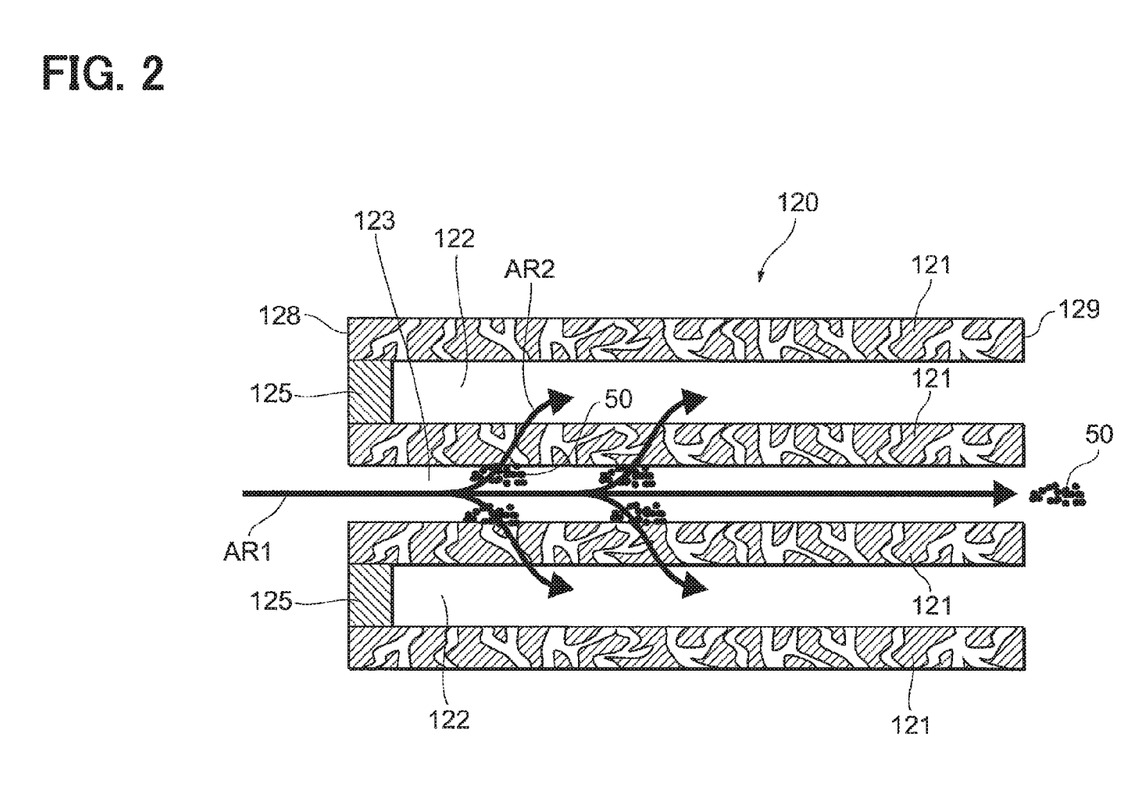
FIG. 2 is a diagram schematically illustrating a configuration of a particulate filter of the exhaust purification device shown in FIG. 1.

That is, the particulate filter 130 has the sealed-inlet cells 122 and the through cells 123 shown in FIG. 2. The sealed-inlet cells 122 and the through cells 123 are arranged alternately with each other through the porous walls 121 respectively.

The particulate filter 130 is different from the particulate filter 120 in a configuration that an entirety of a porous body (i.e., the porous walls 121) holds the same catalysts as the catalysts held in the three-way catalytic agent 110. That is, the particulate filter 130 has both a function collecting the exhaust particulates 50 and a function as the three-way catalytic agent 110.

According to the present embodiment, the NF sensor 31 is located upstream of the particulate filter 130, and the $O_2$ sensor 32 is located downstream of the particulate filter 130. The controller 40 performs the same control as that described in the first embodiment based on the air-fuel ratio signals from the NF sensor 31 and the $O_2$ sensor 32.

That is, the particulate filter 130 is the catalytic agent (i.e., the controlled object catalytic agent), and the air-fuel ratio of the internal combustion engine 10 is controlled based on the air-fuel ratio of the exhaust gas immediately after passing through the particulate filter 130. A quantity of the controlled object catalytic agent is one according to the present embodiment, however may be more than one.

In a case that more than one of the controlled object catalytic agent, the particulate filter 130 is one of the controlled object catalytic agents and is located at a most upstream location in the controlled object catalytic agents. In any case, any controlled object catalytic agent is not located upstream of the particulate filter 130.

Since the particulate filter 130 is located at the most upstream location in the controlled object catalytic agent, a temperature of the particulate filter 130 increases relatively in a short time, and the particulate filter 130 comes in the active state. As a result, the particulate filter 130 starts exerting the function as the three-way catalytic agent promptly.

In addition, the exhaust gas exhausted from the internal combustion engine 10 and having a high temperature reaches an upstream end of the particulate filter 130. The high temperature in this case means a temperature that is higher than the combustion temperature of the exhaust particulates 50. Accordingly, the exhaust particulates 50 are burnt in the particulate filter 130 when being in contact with oxygen, for example, in the fuel constraint performance. That is, the exhaust particulates 50 (and the non-combustible component) accumulated in the particulate filter 130 are removed, and the particulate filter 130 is recovered.

Moreover, since the particulate filter 130 is provided with the through cells 123, a passage resistance of the particulate filter 130 is small, and thereby a pressure loss caused by disposing the particulate filer 130 is relatively small. Accordingly, a large pressure loss having an effect on an operation of the internal combustion engine 10 is not caused even in a case that the particulate filter 130 is located relatively close to the internal combustion engine 10.

According to the first embodiment and the second embodiment, the hydraulic diameter of the sealed-inlet cells 122 is the same as the hydraulic diameter of the through cells 123. However, the hydraulic diameter of the sealed-inlet cells 122 and the hydraulic diameter of the through cells 123 may be different from each other.

For example, the pressure loss caused by disposing the particulate filter 120 may be reduced in a manner that the hydraulic diameter of the through cells 123 is set larger than the hydraulic diameter of the sealed-inlet cells 122.

In contrast, an amount of the exhaust particulates 50 passing through the particulate filter 120 may be reduced in a manner that the hydraulic diameter of the through cells 123 is set smaller than the hydraulic diameter of the sealed-inlet cells 122. That is, the function collecting the exhaust particulates 50 may be improved.

Thus, a degree of the pressure loss and the function collecting the exhaust particulates 50 can be designed as required by setting the hydraulic diameter of the sealed-inlet cells 122 and the hydraulic diameter of the through cells 123 appropriately.

Furthermore, another cell other than the sealed-inlet cells 122 and the through cells 123 may be provided. For example, the cell may be a sealed-ends cell that has an upstream end and a downstream end sealed by the sealing portions 125. The degree of the pressure loss and the function collecting the exhaust particulates 50 can be designed as required by combining the sealed-ends cell, the sealed-inlet cells 122, and the through cells 123 as required.

The embodiments of the present disclosure are described above with specific examples. However, the present disclosure is not limited to the specific examples. That is, modifications that are made as required by a person having ordinary skill in the art based on the specific examples are included in a range of the present disclosure as long as having the features of the present embodiment. For example, elements mentioned in the specific examples, an arrangement, a material, a condition, a shape, a size, etc. of the elements are not limited to the specific examples, and can be changed as required. Elements mentioned in the specific examples can be combined as long as it is technically possible, and the combination is included in the range of the present disclosure as long as having the features of the present embodiment.

The invention claimed is:
1. An exhaust purification device that purifies an exhaust gas exhausted from an internal combustion engine, the exhaust purification device comprising:
a three-way catalytic agent that is located in an exhaust passage of the internal combustion engine; and
a particulate filter that is located downstream of the three-way catalytic agent in the exhaust passage and collects an exhaust particulate, wherein
the three-way catalytic agent is one of a plurality of controlled object catalytic agents and is arranged at a most upstream location in the plurality of controlled object catalytic agents, the exhaust gas flows through the plurality of controlled object catalytic agents, and an air-fuel ratio of the exhaust gas, immediately after passing through the plurality of control subject catalytic agents, is used for controlling an air-fuel ratio of the internal combustion engine, the particulate filter is a honeycomb body provided with a plurality of cells, a part of the plurality of cells are sealed-inlet cells of which upstream ends are sealed, at least a part of other cells of the plurality of cells other than the sealed-inlet cells are through cells through which an upstream side and a downstream side of the particulate filter communicate with each other, and the particulate filter is arranged at a location where a temperature of the exhaust gas reaching an upstream end of the particulate filter is higher than or equal to a combustion temperature of the exhaust particulate, when the three-way catalytic agent is in an active state and when the internal combustion engine is operated.

2. An exhaust purification device that purifies an exhaust gas exhausted from an internal combustion engine, the exhaust purification device comprising:

a three-way catalytic agent that is located in an exhaust passage of the internal combustion engine; and a particulate filter that is located downstream of the three-way catalytic agent in the exhaust passage and collects an exhaust particulate, wherein the three-way catalytic agent is one of a plurality of controlled object catalytic agents and is arranged at a most upstream location in the plurality of controlled object catalytic agents, the exhaust gas flows through the plurality of controlled object catalytic agents, and an air-fuel ratio of the exhaust gas, immediately after passing through the plurality of control subject catalytic agents, is used for controlling an air-fuel ratio of the internal combustion engine, the particulate filter is a honeycomb body provided with a plurality of cells, a part of the plurality of cells are sealed-inlet cells of which upstream ends are sealed, at least a part of other cells of the plurality of cells other than the sealed-inlet cells are through cells through which an upstream side and a downstream side of the particulate filter communicate with each other, and the particulate filter is arranged at a location where a temperature decrease variation from a temperature of the exhaust gas emitted from the three-way catalytic agent to a temperature of the exhaust gas reaching an upstream end of the particulate filter is smaller than or equal to 50° C. when the three-way catalytic agent is in an active state and when the internal combustion engine is operated.

3. An exhaust purification device that purifies an exhaust gas exhausted from an internal combustion engine, the exhaust purification device comprising:

a three-way catalytic agent that is located in an exhaust passage of the internal combustion engine; and a particulate filter that is located downstream of the three-way catalytic agent in the exhaust passage and collects an exhaust particulate, wherein the three-way catalytic agent is one of a plurality of controlled object catalytic agents and is arranged at a most upstream location in the plurality of controlled object catalytic agents, the exhaust gas flows through the plurality of controlled object catalytic agents, and an air-fuel ratio of the exhaust gas, immediately after passing through the plurality of control subject catalytic agents, is used for controlling an air-fuel ratio of the internal combustion engine, the particulate filter is a honeycomb body provided with a plurality of cells, a part of the plurality of cells are sealed-inlet cells of which upstream ends are sealed, at least a part of other cells of the plurality of cells other than the sealed-inlet cells are through cells through which an upstream side and a downstream side of the particulate filter communicate with each other, and a distance between a lower end of the three-way catalytic agent and an upstream end of the particulate filter is shorter than or equal to 50 cm.

4. An exhaust purification device that purifies an exhaust gas exhausted from an internal combustion engine, the exhaust purification device comprising:

a three-way catalytic agent that is located in an exhaust passage of the internal combustion engine; and a particulate filter that is located downstream of the three-way catalytic agent in the exhaust passage and collects an exhaust particulate, wherein the three-way catalytic agent is one of a plurality of controlled object catalytic agents and is arranged at a most upstream location in the plurality of controlled object catalytic agents, the exhaust gas flows through the plurality of controlled object catalytic agents, and an air-fuel ratio of the exhaust gas, immediately after passing through the plurality of control subject catalytic agents, is used for controlling an air-fuel ratio of the internal combustion engine, the particulate filter is a honeycomb body provided with a plurality of cells, a part of the plurality of cells are sealed-inlet cells of which upstream ends are sealed, at least a part of other cells of the plurality of cells other than the sealed-inlet cells are through cells through which an upstream side and a downstream side of the particulate filter communicate with each other, and the particulate filter is arranged at a location where a temperature of the exhaust gas reaching an upstream end of the particulate filter is higher than or equal to a temperature of the exhaust gas immediately before flowing into the three-way catalytic agent, when the three-way catalytic agent is in an active state and when the internal combustion engine is operated.

5. An exhaust purification device that purifies an exhaust gas exhausted from an internal combustion engine, the exhaust purification device comprising a particulate filter that is located in an exhaust passage of the internal combustion engine and has both a function collecting an exhaust particulate and a function as a three-way catalytic agent, wherein the particulate filter is a honeycomb body provided with a plurality of cells, a part of the plurality of cells are sealed-inlet cells of which upstream ends are sealed, at least a part of other cells of the plurality of cells other than the sealed-inlet cells are through cells through which an upstream side and a downstream side of the particulate filter communicate with each other, and the particulate filter is one of a plurality of controlled object catalytic agents and is arranged at a most upstream location in the plurality of controlled object catalytic agents, the exhaust gas flows through the plurality of controlled object catalytic agents, and an air-fuel ratio of the exhaust gas, immediately after passing through the plurality of control subject catalytic agents, is used for controlling an air-fuel ratio of the internal combustion engine.

6. The exhaust purification device according to claim 1, wherein
a hydraulic diameter of the sealed-inlet cells and a hydraulic diameter of the through cells are different from each other.

7. An exhaust purification device that purifies an exhaust gas exhausted from an internal combustion engine, the exhaust purification device comprising:
a three-way catalytic agent that is located in an exhaust passage of the internal combustion engine; and
a particulate filter that is located downstream of the three-way catalytic agent in the exhaust passage and collects an exhaust particulate, wherein
the particulate filter is a honeycomb body provided with a plurality of cells,
the plurality of cells include a sealed-inlet cell of which upstream end is sealed and a through cell through which an upstream side and a downstream side of the particulate filter communicate with each other, and
the particulate filter is arranged at a location where a temperature of the exhaust gas reaching an upstream end of the particulate filter is higher than or equal to a combustion temperature of the exhaust particulate, when the three-way catalytic agent is in an active state and when the internal combustion engine is operated.

8. The exhaust purification device according to claim 7, wherein
the particulate filter is arranged at a location where a temperature decrease variation of the exhaust gas from a temperature of the exhaust gas emitted from the three-way catalytic agent to a temperature of the exhaust gas reaching an upstream end of the particulate filter is smaller than or equal to 50° C.

9. The exhaust purification device according to claim 7, wherein
a distance between a lower end of the three-way catalytic agent and an upstream end of the particulate filter is shorter than or equal to 50 cm.

10. The exhaust purification device according to claim 7, wherein
the particulate filter is arranged at a location where a temperature of the exhaust gas reaching an upstream end of the particulate filter is higher than or equal to a temperature of the exhaust gas immediately before flowing into the three-way catalytic agent.

* * * * *